Oct. 29, 1968  G. J. GOODRICH  3,407,772
ROLL STABILISER FOR FLOATING BODIES
Filed April 5, 1967

INVENTOR
G. J. GOODRICH
BY
Cameron, Kerkam & Sutton
ATTORNEYS

United States Patent Office 3,407,772
Patented Oct. 29, 1968

3,407,772
ROLL STABILISER FOR FLOATING BODIES
Geoffrey John Goodrich, Teddington, England, assignor to National Research Development Corporation, London, England, a corporation of Great Britain
Filed Apr. 5, 1967, Ser. No. 628,723
Claims priority, application Great Britain, Apr. 6, 1966, 15,283/66
5 Claims. (Cl. 114—125)

ABSTRACT OF THE DISCLOSURE

A passive roll stabiliser for ships or other floating bodies comprises a tank symmetrically athwart and above the roll axis, in which water or other fluid moves out of phase and lagging behind the shift roll, the natural period of the fluid flow being increased as compared with that of a simple rectangular tank for a given depth of fluid by the provision of an imperforate platform symmetrically disposed on the bottom of the central part of the tank extending fully fore and aft and surmounted by a divider or dividers extending lengthwise and forming in conjunction with the fore and aft walls of the tank, channels the total width of which is substantially less than that of the tank and the divider or dividers being so high that normally all fluid flows within the channels. There may be one divider forming two channels of equal width. The ends of the platform and dividers may be bevelled and coplanar to improve the streamlining of the obstruction they present. The system is especially suitable for ships of long roll period e.g. 15 seconds.

---

This invention relates to passive roll stabilisers for ships or other floating bodies and is concerned with that kind in which water or some other fluid is contained within a tank or tanks arranged athwart the axis of roll of the floating body so that the body rolls the contained fluid flows from side to side to damp the roll. Such stabilisers are described for example in the specifications of British Patent Nos. 962,343 and 1,006,036, while the specification of British Patent No. 1,010,865 describes a suitable fluid for use in such stabilisers.

It has long been known, see for example the paper by P. Watts published in the Transactions of the Institution of Naval Architects, Volume 34, 1883, that ideally the to and fro motion of the water should be out of phase with and lagging behind the ship roll by approximately 90°. It is also known to retard the rate of flow of water from side to side, see the specifications of the patents already referred to and Watts' paper, so as to bring it into the desired phase relationship by incorporating some form of obstruction. The obstruction may take the form of an adjustable valve, or extend in the fore and after direction to produce a fixed throat, or take the form of a broad crested weir symmetrically arranged on the bottom of the tank extending over about half the length of the tank, with ends sloping upwardly towards the top of the weir, and a height about half the static level of the fluid. Any of these different forms of obstruction produces a reduction in the cross sectional area through which all the fluid passes as it flows from side to side.

According to the present invention a passive roll stabiliser for ships or other floating bodies comprises a tank for containing a fluid and extending symmetrically from side to side across to roll the axis of the floating body, an imperforate platform at the bottom of the tank reducing the depth of fluid in the central portion of the tank, the platform extending across the fore and aft width of the tank and being symmetrical to said roll axis, and at least one divider reducing the effective fore and aft width of said tank over said central portion, the divider being substantially symmetrical to said roll axis and forming in conjunction with said platform and with at least one long side of the tank at least one channel athwart said roll axis, the height of the divider being such that in use substantially all fluid flowing over said platform flows within the channel(s).

The combination of the divider(s) and platform produces open-topped throat(s) located above the bottom of the tank. Usually a single divider suffices, producing two throats of equal fore and aft width, the width being appreciably less than half the fore and aft width of the tank.

Figure 1:
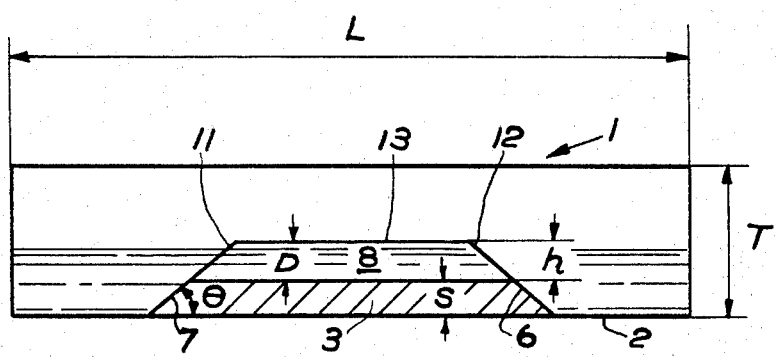
Figure 2:
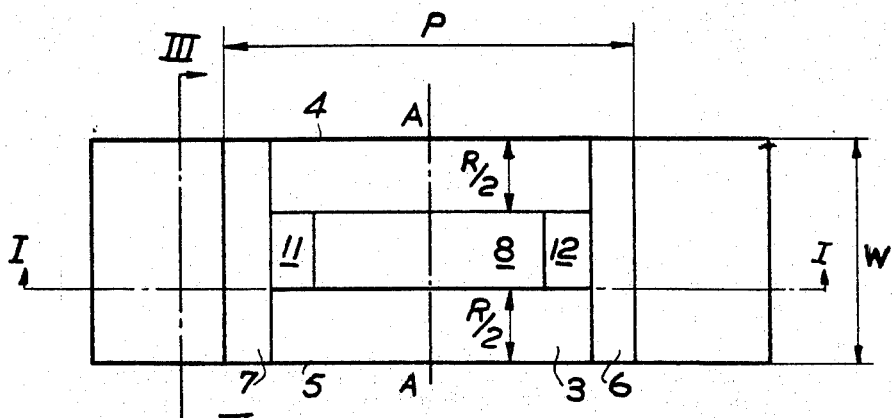
Figure 3:
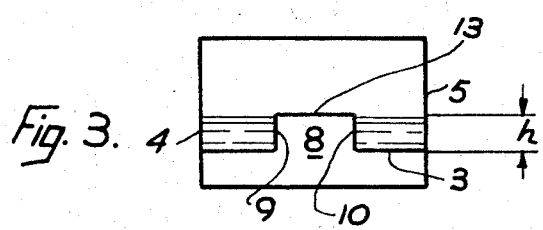

For a better understanding of the invention and to show how the same may be carried into effect, reference will now be made to the accompanying drawings in which:

FIGURE 1 is a diagrammatic cross-section of a stabiliser, or a plane normal to the axis of roll, FIGURE 2 is a plan view of FIGURE 1, and FIGURE 3 is a cross-section taken on the line III—III in FIGURE 2.

Referring now to the drawings, the passive roll stabiliser comprises a rectangular tank 1 which is intended to be located above the roll axis of a floating body such as a ship, with its length symmetrically athwart the roll axis which is thus normal to the plane of FIGURE 1. Ideally the roll axis is as far below the bottom 2 of the tank as possible, in other words the tank is as high above this axis as possible. In FIGURE 2 the plane in which the roll axis lies is indicated by the dotted line AA. At the bottom of the tank 1 is an imperforate platform 3 which is rectangular in plan and has a flat upper face, horizontal when at rest. The platform extends across the fore and aft width of the tank, that is to say, from long side 4 to long side 5 of the tank. The platform, however, only extends lengthwise over a central fraction of the tank. The effect of the platform is to reduce the depth of fluid in the tank over the central portion. The platform 3 is also symmetrical to the roll axis. The free ends 6 and 7 of the platform are bevelled so as to streamline to some extent the flow of fluid over the platform. Upstanding from the top face of the platform 3 is a wall-like divider 8 which extends athwart the roll axis and is symmetrical with respect thereto. The side faces 9 and 10 of the divider extend parallel to the long sides 4 and 5 of the tank. The ends 11 and 12 of the divider are bevelled to the same angle as the edges 6 and 7 of the platform and are coplanar therewith.

In use the tank would be filled, ideally, to a level below the top 13 of the divider but above the top face of the platform so that as the ship (not shown) rolls about the roll axis the fluid flows over the platform and all of it flows between the sides of the tank 4 and 5 and the side faces 9 and 10 of the divider. Thus in effect two throats are formed through which all the fluid flows. In practice it may well be that some part of the fluid also flows over the top of the divider.

The stabiliser has been found particularly suitable for ships having a long period of roll, e.g. above 15 seconds. The stabiliser is suitable because the fluid is retarded due to two different causes, firstly the depth of water is reduced over a significant proportion of the tank (the velocity $v$ of a bore wave in a simple rectangular open tank is approximately proportional to $\sqrt{gh}$, where $h$ is the depth and $g$ is the acceleration due to gravity), and secondly due to the action of the two throats. The effect of introducing a throat which does not alter the depth of fluid in a single rectangular open tank would be to reduce the velocity $v$ by a factor $R/W$, where $R$ is the throat width and $W$ is the tank width. Thus the present stabilizer will have a natural period very roughly equal to $$\frac{2L}{\sqrt{gh}} \times \frac{R}{W}$$

where L is the length of the tank, H is the total width of the throats, W is the width of the tank, h is the depth of fluid in the throats and g is the acceleration due to gravity. This equation does not take into account the effect of turbulence caused by the throats or the ends of the platform or the viscosity of the fluid. It will be apparent that the disadvantage of using a narrow throat to achieve a long natural period avoided (i.e. the impossibility of access to the throat for constructional or maintenance purposes) without using a shallow depth of fluid throughout the tank. A fuller explanation of this point will be found in the specification of copending patent application Ser. No. 524,658 filed Jan. 28, 1966, now Patent No. 3,347,199. The use of a divider to give a double throat also has the advantage that the effect of pitching on the flow of water is reduced, thereby giving a more consistent performance. The divider need not be located centrally in the tank though this is usually preferable. The ends of the divider 11 and 12 can be shaped otherwise than shown to increase or decrease streamlining. Likewise the ends 6 and 7 of the platform can be shaped to give more or less streamlining. The effect of turbulence in the fluid is discussed in the specification of the copending application above mentioned.

Preferred proportions of the stabiliser are given below by way of example only:

L = the beam of the ship.
T should be greater than 4h.
W depends on the actual period of roll of the body to be stabilised.
R should be not less than a half W.
P should be not less than a half L.
S = h.
D should be greater than h.
θ should be not more than 45°.

What I claim is:
1. A passive roll stabiliser for ships or other floating bodies comprising a tank for containing fluid and extending symmetrically from side to side across the roll axis of the floating body, an imperforate platform at the bottom of the tank reducing the depth of fluid in the central portion of the tank, the platform extending across the fore and aft width of the tank and being symmetrical to said roll axis, and one or more dividers reducing the effective fore and aft width of said tank over said central portion, the divider or dividers being positioned on top of said platform substantially symmetrical to said roll axis and forming in conjunction with said platform and with at least one long side of the tank one or more channels athwart said roll axis, the height of the divider being such that in use substantially all fluid flowing over said platform flows within the channel or channels.

2. A stabiliser according to claim 1 in which there is only one divider.

3. A stabiliser according to claim 1 in which the divider or dividers are so positioned as to form a plurality of channels of equal width.

4. A stabiliser according to claim 1 in which the ends of the platform are bevelled at an angle of not more than 45° to the bottom of the tank.

5. A stabiliser according to claim 4 in which the ends of the divider or dividers are bevelled and coplanar with the ends of the platform.

References Cited
UNITED STATES PATENTS 3,256,848 6/1966 Ripley _____ 114—125
3,272,170 9/1966 Dreyfus _____ 114—125

FERGUS S. MIDDLETON, *Primary Examiner.*

TRYGVE M. BLIX, *Assistant Examiner.*